(12) United States Patent
Manara

(10) Patent No.: US 6,498,480 B1
(45) Date of Patent: Dec. 24, 2002

(54) MAGNETIC NON-CONTACTING ROTARY TRANSDUCER

(75) Inventor: Alan H. Manara, Alta Loma, CA (US)

(73) Assignee: Wabash Technologies, Inc., Huntington, IN (US)

( * ) Notice: Subject to any disclaimer, the term of this patent is extended or adjusted under 35 U.S.C. 154(b) by 55 days.

(21) Appl. No.: 09/721,228

(22) Filed: Nov. 22, 2000

(51) Int. Cl.[7] .............................. G01B 7/30; G01D 5/14; F02P 7/07
(52) U.S. Cl. .............................. 324/207.2; 324/207.22; 123/617
(58) Field of Search .................. 324/207.2, 207.21, 324/207.25, 207.26, 207.22, 235; 330/32 R, 32 H; 123/617

(56) References Cited

U.S. PATENT DOCUMENTS

| | | | |
|---|---|---|---|
| 4,703,261 A | * 10/1987 | Berchtold ............... | 324/207.2 |
| 5,003,363 A | 3/1991 | Lachmann ............... | 357/27 |
| 5,625,289 A | 4/1997 | Daetz et al. ........... | 324/207.14 |
| 5,670,877 A | 9/1997 | Scheiber ................ | 324/207.25 |
| 5,675,250 A | 10/1997 | Berglund et al. ....... | 324/207.25 |
| 5,694,042 A | 12/1997 | Eaton et al. ........... | 324/207.22 |
| 5,698,778 A | 12/1997 | Ban et al. .............. | 73/118.1 |
| 5,712,561 A | 1/1998 | McCurley et al. ....... | 324/207.2 |
| 5,757,179 A | 5/1998 | McCurley et al. ....... | 324/207.2 |
| 5,861,745 A | 1/1999 | Herden .................. | 324/207.2 |
| 5,982,170 A | 11/1999 | McCurley et al. ....... | 324/207.2 |
| 6,034,499 A | 3/2000 | Tranovich .............. | 318/650 |
| 6,330,838 B1 | 12/2001 | Kalsi | |

* cited by examiner

*Primary Examiner*—Walter E. Snow
(74) *Attorney, Agent, or Firm*—Woodard, Emhardt, Naughton Moriarty & McNett (57) ABSTRACT

A magnetic rotary transducer for providing a signal indicative of a rotational position of a control shaft about a rotational axis over a defined range of rotation is disclosed. The magnetic rotary transducer comprises a pair of magnets and a rotor including a pair of loop pole pieces, and an elongated pole piece having a first end adjoined to one of the loop pole pieces and a second end adjoined to the other loop pole piece. Each loop pole piece includes an inner surface defining an air gap area. The control shaft is positioned within the air gap area of one of the loop pole pieces and adjoined thereto whereby the rotor synchronously rotates with the control shaft about the axis over the defined range of rotation. The pair of magnets are adjoined to the other loop pole piece whereby two separate and distinct magnetic fields are generated within the air gap are of the loop pole piece. The magnetic rotary transducer further comprises a magnetic flux sensitive transducer positioned within the air gap area. The magnetic flux sensitive transducer is operable to provide a signal indicative of the rotational position of the control shaft.

39 Claims, 7 Drawing Sheets

MAGNETIC NON-CONTACTING ROTARY TRANSDUCER

BACKGROUND OF THE INVENTION

1. Field of the Invention

The present invention generally relates to the field of rotary transducers, and more specifically to a magnetic rotary transducer for providing a signal indicative of a rotational position of a control shaft about an axis over a defined range of rotation.

2. Background

Magnetic rotary transducers known in the art are operable to output an analog signal as a function of the magnetic flux density of any magnetic flux flowing through one or more magnetic flux sensitive transducers of the magnetic rotary transducer, e.g. a Hall-effect device, a magneto-resistor, etc. Accordingly, each magnetic flux sensitive transducer is positioned within a magnetic field, and the magnitude of the analog signal varies in response to any movement of the magnetic field and/or magnetic flux sensitive transducer(s) that alters the magnetic flux density of the magnetic flux flowing through the magnetic flux sensitive transducer(s). Some magnetic rotary transducers known in the art therefore are utilized to sense each rotational position of a control shaft about an axis over a defined range of rotation. In particular, the automotive industry typically adjoins a control shaft to an accelerator pedal, a throttle valve, an exhaust gas recirculation valve, etc., whereby the rotational position of the control shaft is indicative of a rotational position of the accelerator pedal, the throttle valve, the exhaust gas recirculation valve, etc. The automotive industry as well as other industries are therefore constantly striving to improve upon the performance and to decrease the cost and size of magnetic rotary transducers.

SUMMARY OF THE INVENTION

The present invention is a new and improved magnetic rotary transducer. Various aspects of the present invention are novel, non-obvious, and provide various advantages. While the actual nature of the present invention described in detail herein can only be determined with reference to the claims appended hereto, certain features which are characteristic of the present invention disclosed herein can be described briefly.

One form of the present invention is a magnetic rotary transducer comprising a loop pole piece having an inner surface defining an air gap area, and a pair of magnets adjoined to the loop pole piece. The first magnet generates a first magnetic field in the air gap area, and the second magnet generates a second magnetic field within the air gap area. The loop pole piece is operable to be rotated about an axis over a defined range of rotation with the magnetic fields synchronously rotating therewith. The magnetic rotary transducer further comprises a magnetic flux sensitive transducer. The magnetic flux sensitive transducer is disposed within air gap area and is operable to provide a signal indicative of a rotational position of the loop pole piece over the defined range of rotation.

Another form of the present invention is a system comprising a control shaft, and the magnetic rotary transducer. The control shaft is operable to rotated over the defined range of rotation. The loop pole piece is adjoined to the control shaft whereby the signal from the magnetic flux sensitive transducer is indicative of a rotational position of the control shaft over the defined range of rotation.

Further forms, objects, features, aspects, benefits, advantages, and embodiments of the present invention shall become apparent from the detailed description and drawings provided herewith.

DESCRIPTION OF THE PREFERRED EMBODIMENTS

For the purposes of promoting an understanding of the principles of the present invention, reference will now be made to the preferred embodiments illustrated in the drawings and specific language will be used to describe the same. It will nevertheless be understood that no limitation of the scope of the present invention is thereby intended, such alterations and further modifications in the illustration embodiments and such further applications of the principles of the present invention as illustrated therein being contemplated as would normally occur to one skilled in the art to which the present invention relates. For purposes of the present invention, the term adjoined is broadly defined as an unitary fabrication, a permanent affixation, a detachable coupling, an engagement, or a contiguous disposal by any method as would occur to one skilled in the art of the present invention.

The present invention is a novel and unique magnetic rotary transducer for providing a signal indicative of a rotational position of a control shaft about an axis over a defined range of rotation without experiencing magnetic hysteresis. For purposes of the present invention, a control shaft is broadly defined as any article of manufacture or any combination of manufactured articles that is adjoined to an object, e.g. an accelerator pedal, a throttle valve, an exhaust gas recirculation valve, etc., to control a linear, an angular, and/or a rotational movement of the object as the control shaft is rotated about an axis, e.g. a longitudinal axis of the control shaft. Referring to FIGS. 1A–1D, a first embodiment of a magnetic rotary transducer 10 in accordance with the present invention is shown. Magnetic rotary transducer 10 senses each degree of rotation of a control shaft 20 about a rotational axis over a defined range of rotation without experiencing magnetic hysteresis as further described in FIGS. 2A–2C and accompanying text.

Magnetic rotary transducer 10 comprises a ferromagnetic rotor 11 including a loop pole piece 12, a loop pole piece 13, and an elongated pole piece 14. For purposes of the present invention, a loop pole piece is broadly defined as any magnetizable article of manufacture or any combination of manufactured magnetizable articles that has a closed configuration defining an air gap area. Accordingly, loop pole piece 12 has an inner diameter surface 12a defining an air gap area (not shown), and loop pole piece 13 has an inner diameter surface 13a defining an air gap area 13c. An end 14a of elongated pole piece 14 is unitarily fabricated with an outer surface 12b of loop pole piece 12, and an end 14b of elongated pole piece 14 is unitarily fabricated with an outer surface 13b of loop pole piece 13. In alternative embodiments of magnetic rotary transducer 10, elongated pole piece 14 can be adjoined to loop pole piece 12 and/or loop pole piece 13 by other methods as would occur to one skilled in the art of the present invention. Control shaft 20 is positioned within the air gap area of loop pole piece 12, and permanently affixed to inner surface 12a of loop pole piece 12. In alternative embodiments of magnetic rotary transducer 10, control shaft 20 can be adjoined to loop pole piece 12 by other methods as would occur to one skilled in the art of the present invention; or loop pole piece 12 can be omitted and elongated pole piece 14 can be adjoined to control shaft 20 as would occur to one skilled in the art of the present invention; or loop pole piece 12 and elongated pole piece 14 can be omitted and loop pole piece 13 can be adjoined to control shaft 20 as would occur to one skilled in the art of the present invention. Magnetic rotary transducer 10 further comprises a magnet 15 and a magnet 16.

Magnet 15 is seated within a slot 13d of loop pole piece 13 and permanently affixed thereto. Magnet 16 is seated within a slot 13e of loop pole piece 13 and permanently affixed thereto. In alternative embodiments of magnetic rotary transducer 10, magnet 15 and/or magnet 16 can be adjoined to loop pole piece 13 by other methods as would occur to one skilled in the art of the present invention. Magnet 15 includes a north pole surface 15a and a south pole surface 15b. Magnet 16 includes a north pole surface 16a and a south pole surface 16b. North pole surface 15a and north pole surface 16a are parallel and face air gap area 13c whereby two distinct and separate magnetic fields are generated within air gap area 13c as further described in connection with FIGS. 2A–2C, and accompanying text. In alternative embodiments of magnetic rotary transducer 10, any other combination of north pole surface 15a, south pole surface 15b, north pole surface 16a, and/or south pole surface 16b can face air gap area 13c whereby two distinct and separate magnetic fields are generated within air gap area 13c as would occur to one skilled in the art of the present invention. Additionally, the orientation of the chosen combination can vary as would occur to one skilled in the art of the present invention.

Magnetic rotary transducer 10 further comprises a magnetic flux sensitive transducer in the form of a Hall effect device 17. Hall effect device 17 has a surface 17a and a surface 17b, includes an input lead 17c, a reference lead 17d, a first output lead 17e, and a second output lead 17f. In response to a current drive signal and a voltage drive signal being applied to input lead 17c and reference lead 17d, Hall effect device 17 is operable to sense a magnetic flux density of any magnetic flux flowing through surface 16a and a magnetic flux density of any magnetic flux flowing through surface 16b, and to provide a voltage sensing signal $V_{SS1}$ and a voltage sensing signal $V_{SS2}$ as a function of the respective sensed magnetic flux densities as further described in connection with FIG. 2D and accompanying text.

Referring to FIGS. 2A–2D, an exemplary operation of magnetic rotary transducer 10 in providing voltage sensing signal $V_{SS1}$ and a voltage sensing signal $V_{SS2}$ will now be described herein. Magnet 15 is shown generating a magnetic field 15c within air gap area 13c, and magnet 16 is shown generating a magnetic field 16c within air gap area 13c. As would occur to one skilled in the art, it will be a rare instance in which magnetic field 15c and magnetic field 16c are identical in terms of strength and dimensions. However, for the simplicity of the description of the operation of magnetic rotary transducer 10, magnetic field 15c and magnetic field 16c are illustrated as being identical in terms of strength and dimensions.

Figures 1A, 1B:
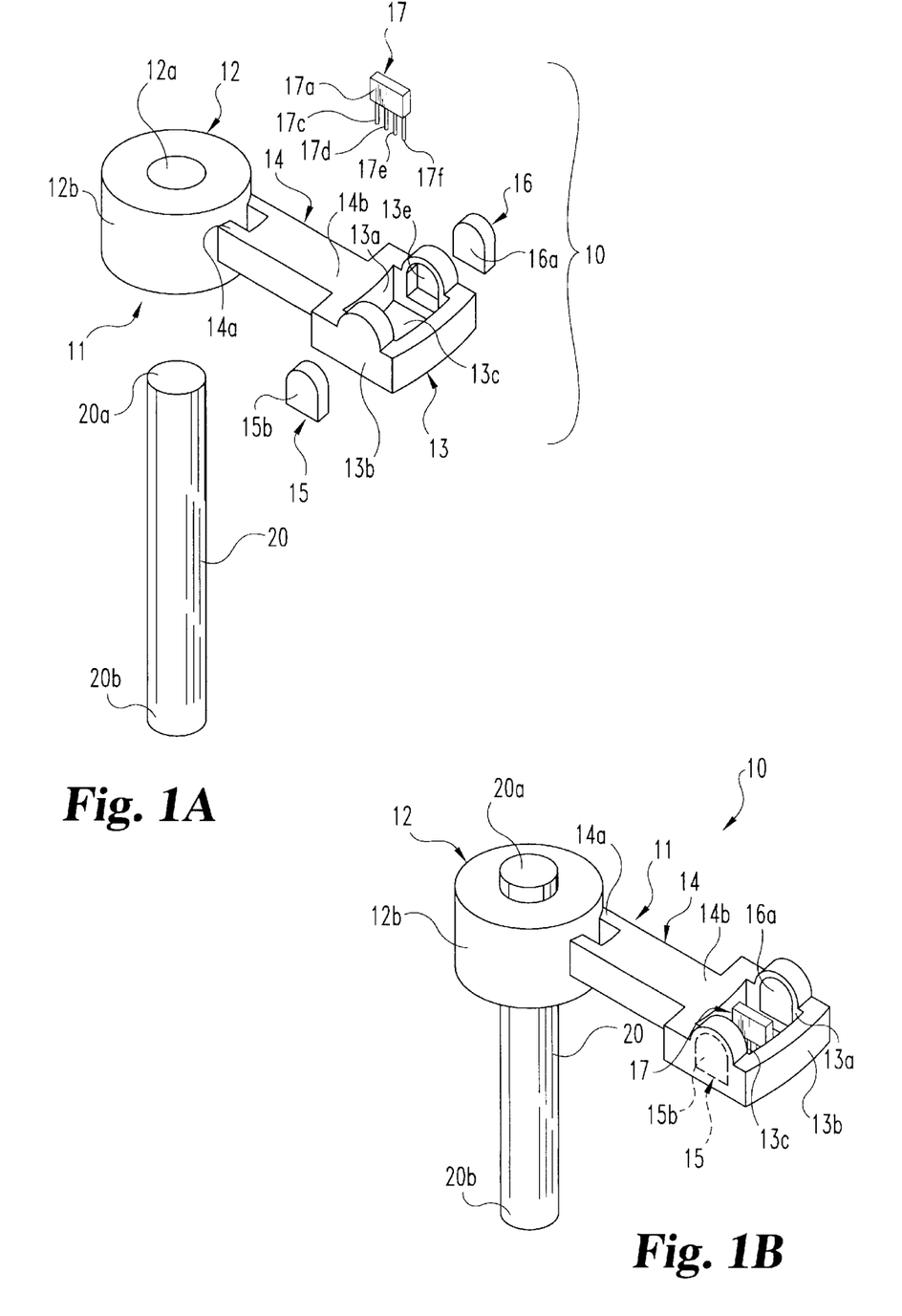
FIG. 1A is a first exploded view of a first embodiment of a magnetic rotary transducer in accordance with the present invention.
FIG. 1B is a first perspective view of the magnetic rotary transducer of FIG. 1A, as assembled and adjoined to a control shaft.
Figure 1C:
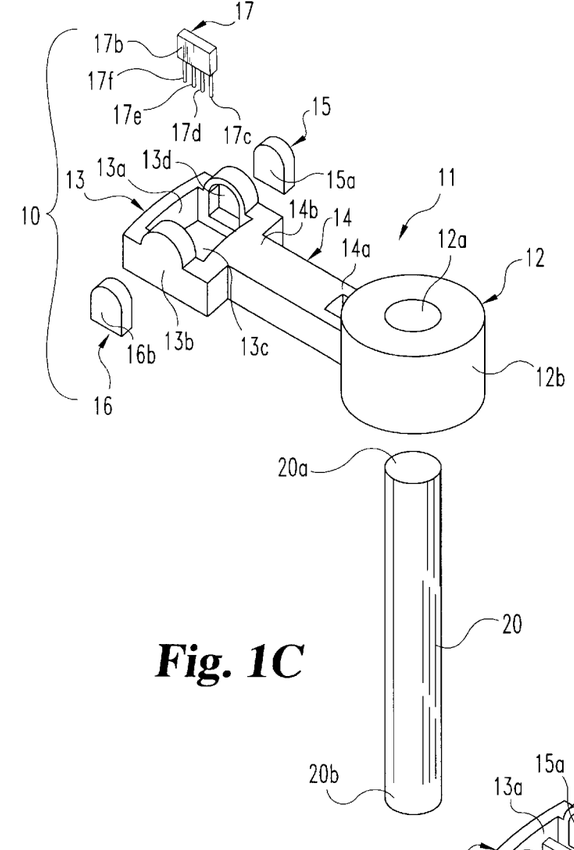
FIG. 1C is a second exploded view of the magnetic rotary transducer of FIG. 1A.
Figure 1D:
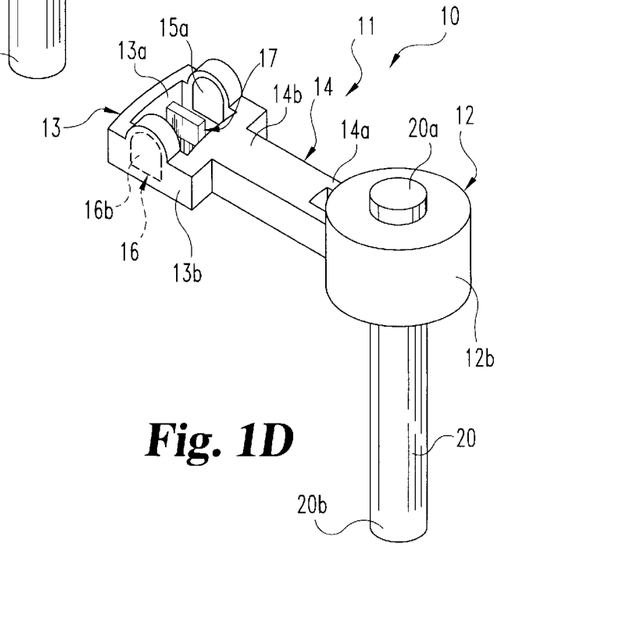
FIG. 1D is a second perspective view of the magnetic rotary transducer of FIG. 1C, as assembled and adjoined to a control shaft.
Figure 2A:
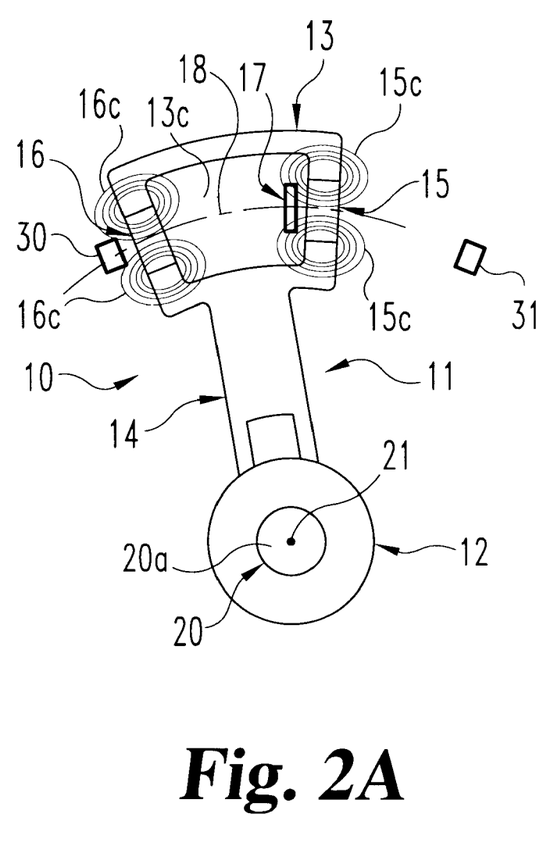
FIG. 2A is a first diagrammatic illustration of an operation of the magnetic rotary transducer of FIGS. 1A–1D in a starting rotational position.
Figure 2B:
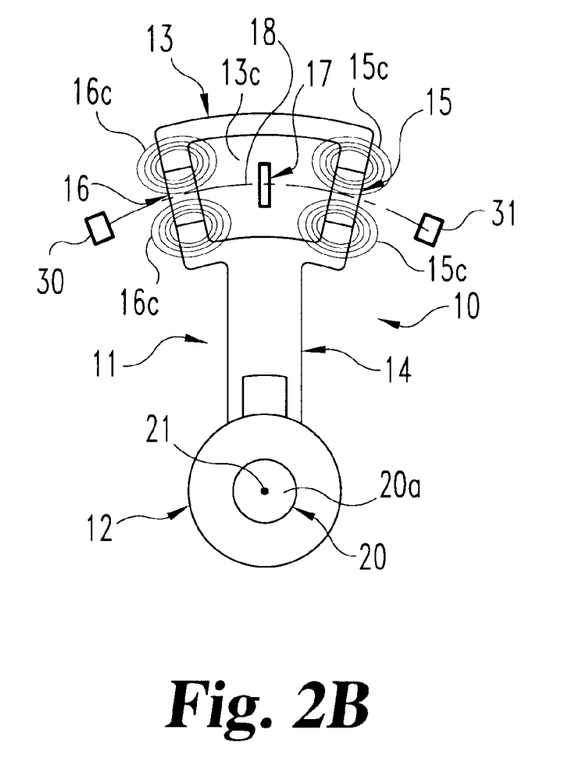
FIG. 2B is a second diagrammatic working illustration of the operation of the magnetic rotary transducer of FIGS. 1A–1D in a middle rotational position.
Figure 2C:
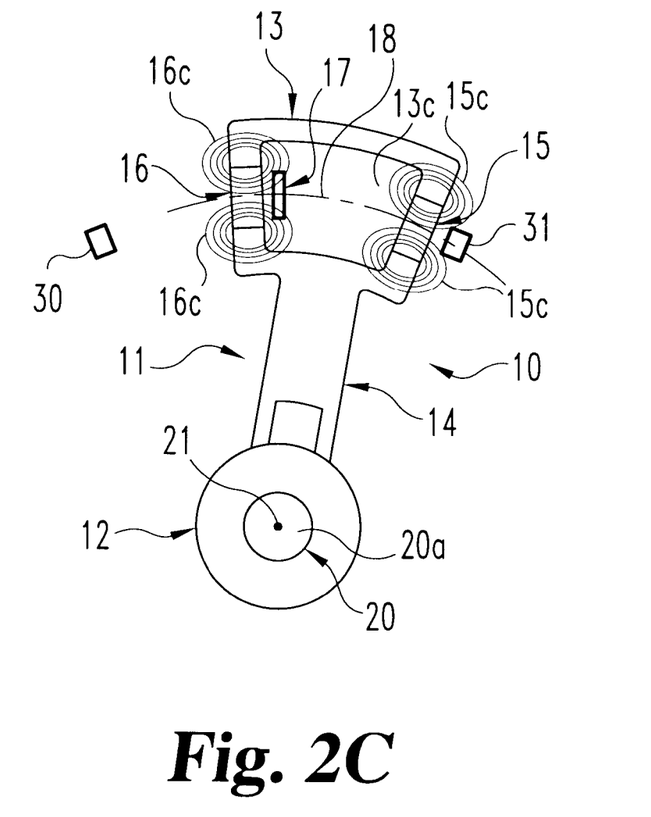
FIG. 2C is a third diagrammatic working illustration of the operation of the magnetic rotary transducer of FIGS. 1A–1D in a final rotational position.
Figure 2D:
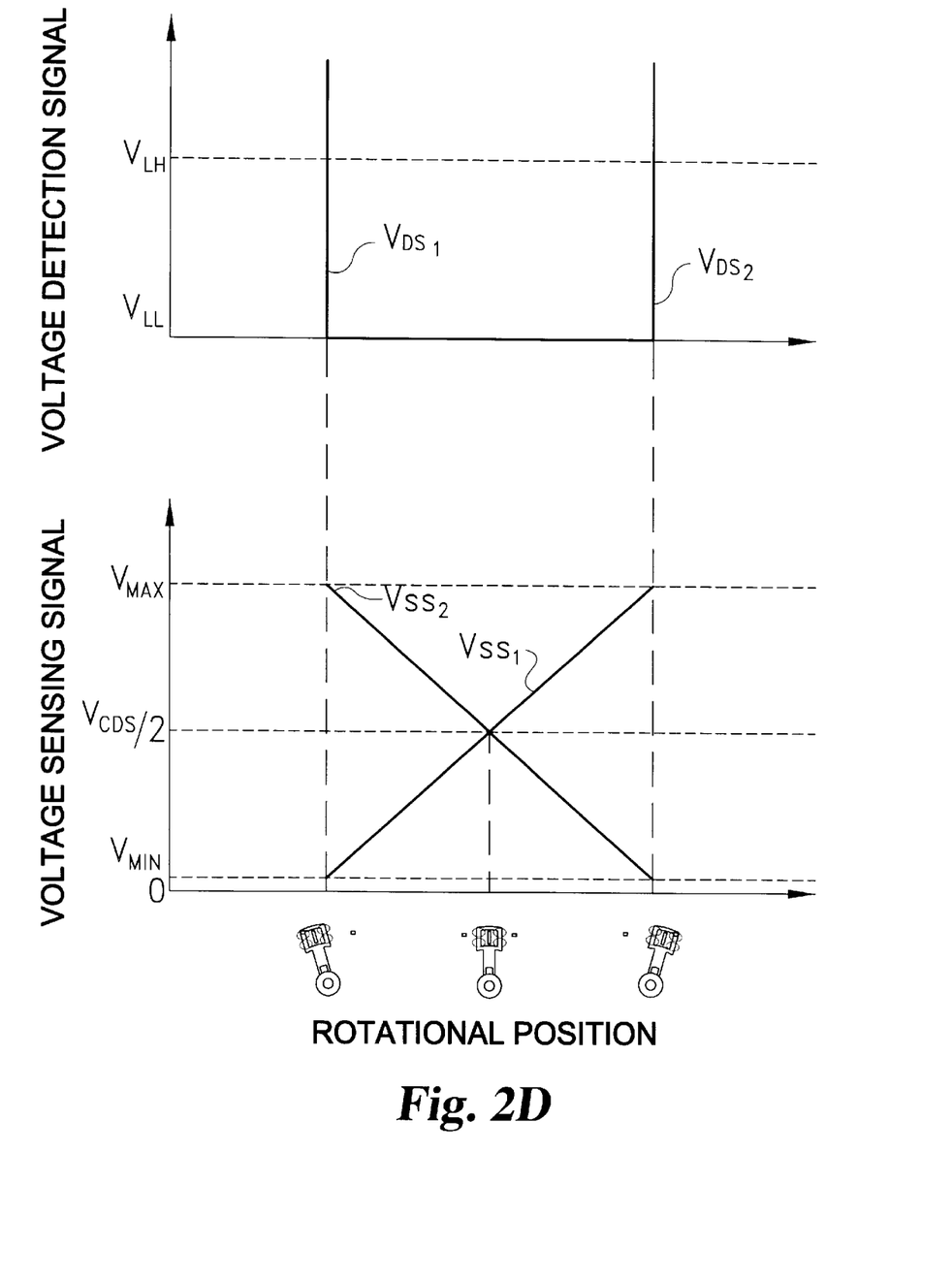
FIG. 2D is graphical illustrations of a first voltage sensing signal, a second voltage sensing signal, a first voltage detection signal, and a second voltage detection signal as provided during an operation the magnetic rotary transducer of FIGS. 2A–2C.

Control shaft 20 is operable to be rotated about a longitudinal axis 21 of control shaft 20 between a starting rotational position of a defined range of rotation illustrated in FIG. 2A and a final rotational position illustrated in FIG. 2C. Rotor 11, magnet 15, and magnet 16 therefore synchronously rotate about axis 21 with control shaft 20 between the starting rotational position and the final rotational position. As a result, Hall effect device 17 provides voltage sensing signal $V_{SS1}$ and voltage sensing signal $V_{SS2}$ as a function of the positioning along a trajectory 18 of Hall effect device 17 within air gap area 13c relative to magnetic field 15c and magnetic field 16c. In this particular exemplary illustration of the operation of magnetic rotary transducer 10, voltage sensing signal $V_{SS1}$ and voltage sensing signal $V_{SS2}$ are linearly provided by Hall effect device 17 between a minimum voltage level $V_{MIN}$ and a maximum voltage level $V_{MAX}$ with half of a voltage drive signal $V_{CDS}$ being a midpoint voltage level as shown in FIG. 2D. As such, voltage sensing signal $V_{SS1}$ and voltage sensing signal $V_{SS2}$ are indicative of a rotational position of control shaft 20, and rotor 11, particularly loop pole piece 14, between the starting rotational position and the final rotational position. In alternative embodiments of magnetic rotary transducer 10, magnetic flux sensitive transducer 10 can be positioned along a trajectory alternative to trajectory 18 whereby voltage sensing signal $V_{SS1}$ and voltage sensing signal $V_{SS2}$ are linearly provided by Hall effect device 17 between the starting rotational position and the final rotational position.

When the present rotational position of control shaft 20 and loop pole piece 14 coincide with the starting rotational position illustrated in FIG. 2A, magnetic flux sensitive transducer 10 is entirely within magnetic field 15c and entirely spaced from magnetic field 16c. In alternative embodiments of magnetic rotary transducer 10, particularly when magnetic field 15c and magnetic field 16c are not identical in terms of strength and dimensions, magnetic flux sensitive transducer 10 can be partially within magnetic field 15c and entirely spaced from magnetic field 16c when the present rotational position of control shaft 20 and loop pole piece 14 coincide with the starting rotational position; or be partially within magnetic field 15c and partially within magnetic field 16c when the present rotational position of control shaft 20 and loop pole piece 14 coincide with the starting rotational position.

When the present rotational position of control shaft 20 and loop pole piece 14 coincide with the final rotational position illustrated in FIG. 2C, magnetic flux sensitive transducer 10 is entirely within magnetic field 16c and entirely spaced from magnetic field 15c. In alternative embodiments of magnetic rotary transducer 10, particularly when magnetic field 15c and magnetic field 16c are not identical in terms of strength and dimensions, magnetic flux sensitive transducer 10 can be partially within magnetic field 16c and entirely spaced from magnetic field 15c when the present rotational position of control shaft 20 and loop pole piece 14 coincide with the final rotational position; or be partially within magnetic field 15c and partially within magnetic field 16c when the present rotational position of control shaft 20 and loop pole piece 14 coincide with the final rotational position.

When the present rotational position of control shaft 20 and loop pole piece 14 coincide with a middle rotational position illustrated in FIG. 2B, magnetic flux sensitive transducer 10 is entirely spaced from magnetic field 15c and entirely spaced from magnetic field 16c. In alternative embodiments of magnetic rotary transducer 10, particularly when magnetic field 15c and magnetic field 16c are not identical in terms of strength and dimensions, magnetic flux sensitive transducer 10 can be partially within magnetic field 15c and entirely spaced from magnetic field 16c when the present rotational position of control shaft 20 and loop pole piece 14 coincide with the middle rotational position; or partially within magnetic field 16c and entirely spaced from magnetic field 15c when the present rotational position of control shaft 20 and loop pole piece 14 coincide with the middle rotational position; or partially within magnetic field 15c and partially within magnetic field 16c when the present rotational position of control shaft 20 and loop pole piece 14 coincide with the middle rotational position.

Still referring to FIGS. 2A–2D, a magnetic flux sensitive switch 30 operable to provide a voltage detection signal $V_{DS1}$ and/or a magnetic flux sensitive switch 31 operable to provide a voltage detection signal $V_{DS2}$ can be included in alternative embodiments of magnetic rotary transducer 10. Magnetic flux sensitive switch 30 is positioned relative to control shaft 20 whereby voltage detection signal $V_{DS1}$ equates a voltage logic high state $V_{LH}$ when the present rotational position of control shaft 20 and loop pole piece 14 coincides with the starting rotational position, and voltage detection signal $V_{DS1}$ equates a voltage logic low state $V_{LL}$ when the present rotational position of control shaft 20 and loop pole piece 14 does not coincide with the starting rotational position. Magnetic flux sensitive switch 31 is positioned relative to control shaft 20 whereby voltage detection signal $V_{DS2}$ equates the voltage logic high state $V_{LH}$ when the present rotational position of control shaft 20 and loop pole piece 14 coincides with the final rotational position, and voltage detection signal $V_{DS2}$ equates voltage logic low state $V_{LL}$ when the present rotational position of control shaft 20 and loop pole piece 14 does not coincide with the final rotational position.

Figure 3:
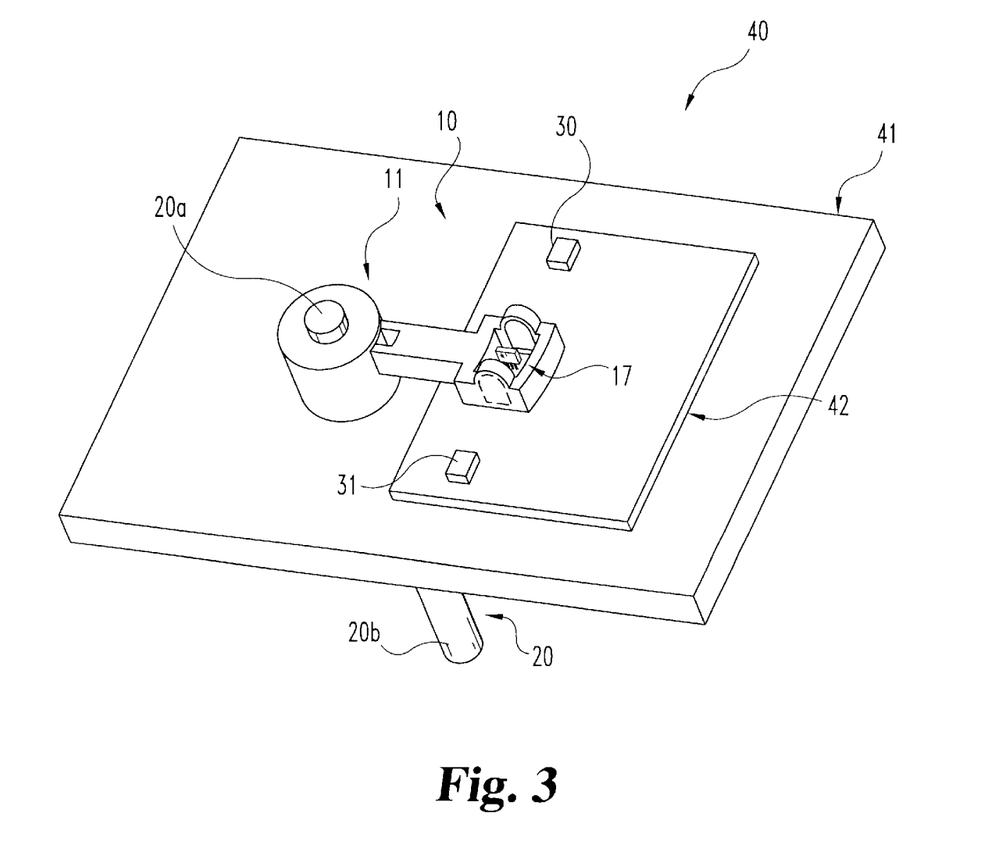
FIG. 3 is a perspective view of the magnetic rotary transducer of FIGS. 1A–1D, as implemented into an overall system.

A system 40 comprising magnetic rotary transducer 10 and control shaft 20 is shown in FIG. 3. Referring to FIG. 3, system 40 further comprises a platform 41 and a PC board 42. End 20a of control shaft 20 is adjoined to rotor 11 as previously described herein. Control shaft 20 is extended through and rotatable within an opening (not shown) in platform 41 with end 20b adjoined to an object (not shown), e.g. an accelerator pedal, a throttle valve, an exhaust gas recirculation valve, etc., to control a linear, an angular, and/or a rotational movement of the object as control shaft 20 is rotated about its longitudinal axis. Hall effect device 17, magnetic flux sensitive switch 30, and magnetic flux sensitive switch 31 are electrically coupled to PC board 42 to receive sufficient operational electrical power to thereby provide voltage sensing signal $V_{SS1}$, voltage sensing signal $V_{SS2}$, voltage detection signal $V_{DS1}$, and voltage detection signal $V_{DS2}$ as previously described herein. In alternative embodiments of magnetic rotary transducer 10, an additional magnetic flux sensitive transducer like Hall effect device 117 as shown can be electrically coupled to PC board 42 to receive sufficient operational electrical power to thereby provide a second pair of voltage sensing signal $V_{SS1}$ and voltage sensing signal $V_{SS2}$.

While the present invention has been illustrated and described in detail in the drawings and foregoing description, the same is to be considered as illustrative and not restrictive in character, it being understood that the preferred embodiment has been shown and described and that all changes and modifications that come within the spirit of the invention are desired to be protected.

What is claimed is:

1. A magnetic rotary transducer for sensing the instantaneous rotational position of an object, comprising:
   a loop pole piece operable to be rotated about an axis between a first rotational position and a second rotational position, said loop pole piece defining an air gap area;
   a first magnet generating a first magnetic field within said air gap area, said first magnet adjoined to said loop pole piece whereby said first magnetic field is synchronously rotated with said loop pole piece about said axis;
   a second magnet generating a second magnetic field within said air gap area and spaced from said first magnetic field, said second magnet adjoined to said loop pole piece whereby said second magnetic field is synchronously rotated with said loop pole piece about said axis;
   a control shaft operably coupled between the loop pole piece and the object whereby said first and second magnetic fields are synchronously rotated about said axis in response to rotation of the object; and
   a first magnetic flux sensitive transducer positioned within said air gap area, said first magnetic flux sensitive transducer operable to provide a first signal indicative of a third rotational position of said loop pole piece corresponding to the instantaneous rotational position of the object.

2. The magnetic rotary transducer of claim 1, wherein said first magnetic flux sensitive transducer is entirely within said first magnetic field and entirely spaced from said second magnetic field when said third rotational position coincides with said first rotational position.

3. The magnetic rotary transducer of claim 2, wherein said first magnetic flux sensitive transducer is entirely spaced from said first magnetic field and entirely within said second magnetic field when said third rotational position coincides with said second rotational position.

4. The magnetic rotary transducer of claim 2, wherein said first magnetic flux sensitive transducer is entirely spaced from said first magnetic field and partially within said second magnetic field when said third rotational position coincides with said second rotational position.

5. The magnetic rotary transducer of claim 2, wherein said first magnetic flux sensitive transducer is partially within from said first magnetic field and partially within said second magnetic field when said third rotational position coincides with said second rotational position.

6. The magnetic rotary transducer of claim 1, wherein said first magnetic flux sensitive transducer is partially within said first magnetic field and entirely spaced from said second magnetic field when said third rotational position coincides with said first rotational position.

7. The magnetic rotary transducer of claim 6, wherein said first magnetic flux sensitive transducer is entirely spaced from said first magnetic field and entirely within said second magnetic field when said third rotational position coincides with said second rotational position.

8. The magnetic rotary transducer of claim 6, wherein said first magnetic flux sensitive transducer is entirely spaced from said first magnetic field and partially within said second magnetic field when said third rotational position coincides with said second rotational position.

9. The magnetic rotary transducer of claim 6, wherein said first magnetic flux sensitive transducer is partially within from said first magnetic field and partially within said second magnetic field when said third rotational position coincides with said second rotational position.

10. The magnetic rotary transducer of claim 1, wherein said first magnetic flux sensitive transducer is partially within said first magnetic field and partially within said second magnetic field when said third rotational position coincides with said first rotational position.

11. The magnetic rotary transducer of claim 10, wherein said first magnetic flux sensitive transducer is entirely spaced from said first magnetic field and entirely within said second magnetic when said third rotational position coincides with said second rotational position.

12. The magnetic rotary transducer of claim 10, wherein said first magnetic flux sensitive transducer is entirely spaced from said first magnetic field and partially within said second magnetic field when said third rotational position coincides with said second rotational position.

13. The magnetic rotary transducer of claim 10, wherein said first magnetic flux sensitive transducer is partially within from said first magnetic field and partially within said second magnetic field when said third rotational position coincides with said second rotational position.

14. The magnetic rotary transducer of claim 1,
   wherein said first signal linearly increases as said loop pole piece is rotated in a direction away from said first rotational position and toward said second rotational position; and
   wherein said second signal linearly decreases as said loop pole piece is rotated in a direction toward said first rotational position and away from said second rotational position.

15. The magnetic rotary transducer of claim 1,
   wherein said first magnet includes a first pole surface facing said air gap area; and
   wherein said second magnet includes a second pole surface facing said air gap area, said first pole surface and said second pole surface having identical polar characteristics; and
   wherein said loop pole piece defines a pair of opposing slots, said first and second magnets being seated within respective ones of said opposing slots.

16. The magnetic rotary transducer of claim 15, wherein said first pole surface and said second pole surface are substantially parallel.

17. The magnetic rotary transducer of claim 1, further comprising:
   a second magnetic flux sensitive transducer positioned within said air gap area, said second magnetic flux sensitive transducer operable to provide a second signal indicative of said third rotational position of said loop pole piece corresponding to the instantaneous rotational position of the object.

18. The magnetic rotary transducer of claim 1, further comprising:
   a first magnetic flux sensitive switch disposed outside of said air gap area, said first magnetic flux sensitive switch being operable to provide a second signal indicative of when said third rotational position coincides with said first rotational position.

19. The magnetic rotary transducer of claim 18, further comprising:
   a second magnetic flux sensitive switch disposed outside of said air gap area, said second magnetic flux sensitive switch being operable to provide a third signal indicative of when said third rotational position coincides with said second rotational position.

20. A system for sensing the instantaneous rotational position of an object, comprising:
   a control shaft operable to be rotated about an axis between a first rotational position and a second rotational position, said control shaft operably coupled to the object to synchronously rotate said control shaft in response to rotation of the object;
   a first loop pole piece operable to be synchronously rotated with said control shaft about said axis, said first loop pole piece defining an air gap area;
   a first magnet generating a first magnetic field within said air gap area, said first magnet adjoined to said first loop pole piece whereby said first magnetic field is synchronously rotated with said control shaft about said axis;
   a second magnet generating a second magnetic field within said air gap area and spaced from said first magnetic field, said second magnet adjoined to said first loop pole piece whereby said second magnetic field is synchronously rotated with said control shaft about said axis; and
   a first magnetic flux sensitive transducer positioned within said air gap area, said first magnetic flux sensitive transducer operable to provide a first signal indicative of a third rotational position of said control shaft between said first rotational position and said second rotational position corresponding to the instantaneous rotational position of the object.

21. The system of claim 20 wherein said first magnetic flux sensitive transducer is entirely within said first magnetic field and entirely spaced from said second magnetic field when third rotational position coincides with said first rotational position.

22. The system of claim 21, wherein said first magnetic flux sensitive transducer is entirely spaced from said first magnetic field and entirely within said second magnetic field when said third rotational position coincides with said second rotational position.

23. The system of claim 21, wherein said first magnetic flux sensitive transducer is entirely spaced from said first magnetic field and partially within said second magnetic field when said third rotational position coincides with said second rotational position.

24. The system of claim 21, wherein said first magnetic flux sensitive transducer is partially within from said first magnetic field and partially within said second magnetic field when said third rotational position coincides with said second rotational position.

25. The system of claim 20, wherein said first magnetic flux sensitive transducer is partially within said first magnetic field and entirely spaced from said second magnetic field when said third rotational position coincides with said first rotational position.

26. The system of claim 25, wherein said first magnetic flux sensitive transducer is entirely spaced from said first magnetic field and entirely within said second magnetic field when said third rotational position coincides with said second rotational position.

27. The system of claim 25, wherein said first magnetic flux sensitive transducer is entirely spaced from said first magnetic field and partially within said second magnetic field when said third rotational position coincides with said second rotational position.

28. The system of claim 25, wherein said first magnetic flux sensitive transducer is partially within from said first magnetic field and partially within said second magnetic field when said third rotational position coincides with said second rotational position.

29. The system of claim 20, wherein said first magnetic flux sensitive transducer is partially within said first magnetic field and partially within said second magnetic field when said third rotational position coincides with said first rotational position.

30. The system of claim 29, wherein said first magnetic flux sensitive transducer is entirely spaced from said first magnetic field and entirely within said second magnetic field when said third rotational position coincides with said second rotational position.

31. The system of claim 30, wherein said first magnetic flux sensitive transducer is entirely spaced from said first magnetic field and partially within said second magnetic field when said third rotational position coincides with said second rotational position.

32. The system of claim 30, wherein said first magnetic flux sensitive transducer is partially within from said first magnetic field and partially within said second magnetic field when said third rotational position coincides with said second rotational position.

33. The system of claim 20,
    wherein said first signal linearly increases as said control shaft rotates in a direction away from said first rotational position and toward said second rotational position; and
    wherein said second signal linearly decreases as said control shaft rotates in a direction toward said first rotational position and away from said second rotational position.

34. The system of claim 20,
    wherein said first magnet includes a first pole surface facing said air gap area; and
    wherein said second magnet includes a second pole surface facing said air gap area, said first pole surface and said second pole surface having substantially identical polar characteristics.

35. The system of claim 34, wherein said first pole surface and said second pole surface are parallel.

36. The system of claim 20 further comprising:
    a second magnetic flux sensitive transducer positioned within said air gap area, said second magnetic flux sensitive transducer operable to provide a second signal indicative of said third rotational position of said control shaft corresponding to the instantaneous rotational position of the object.

37. The system of claim 20 further comprising:
    a first magnetic flux sensitive switch disposed outside of said air gap area, said first magnetic flux sensitive switch being operable to provide a second signal indicative of when said third rotational position coincides with said first rotational position.

38. The system of claim 37 further comprising:
    a second magnetic flux sensitive switch disposed outside of said air gap area, said second magnetic flux sensitive switch being operable to provide a third signal indicative of when said third rotational position coincides with said second rotational position.

39. The system of claim 20 further comprising:
    a second loop pole piece adjoined to said control shaft; and
    an elongated pole piece having a first end adjoined to said first loop pole piece and a second end adjoined to said second loop pole piece.

* * * * *